United States Patent [19]
Wang et al.

[11] Patent Number: 5,846,699
[45] Date of Patent: *Dec. 8, 1998

[54] COATING COMPOSITION INCLUDING POLYURETHANE FOR IMAGING ELEMENTS

[75] Inventors: Yongcai Wang; Charles Chester Anderson, both of Penfield, N.Y.

[73] Assignee: Eastman Kodak Company, Rochester, N.Y.

[*] Notice: The term of this patent shall not extend beyond the expiration date of Pat. No. 5,723,275.

[21] Appl. No.: 712,017

[22] Filed: Sep. 11, 1996

[51] Int. Cl.$^6$ .............................. G03C 1/89; G03C 1/93; G03C 1/053; B32B 27/00
[52] U.S. Cl. ......................... 430/528; 430/215; 430/263; 430/527; 430/529; 430/536; 430/537; 430/627; 430/961; 428/423.1; 428/500; 428/522
[58] Field of Search .................................... 430/527, 529, 430/536, 537, 627, 215, 263, 961; 428/500, 522, 423.1

[56] References Cited

U.S. PATENT DOCUMENTS

| | | | |
|---|---|---|---|
| 3,895,949 | 7/1975 | Akamatsu et al. | 430/273 |
| 4,497,917 | 2/1985 | Upson et al. | 523/201 |
| 4,954,559 | 9/1990 | Den Hartog et al. | 524/507 |
| 5,166,254 | 11/1992 | Nickle et al. | 524/512 |
| 5,204,404 | 4/1993 | Werner et al. | 524/501 |
| 5,219,916 | 6/1993 | Den Hartog et al. | 524/515 |
| 5,314,945 | 5/1994 | Nickle et al. | 524/507 |
| 5,366,855 | 11/1994 | Anderson et al. | 430/523 |
| 5,447,832 | 9/1995 | Wang et al. | 430/523 |

OTHER PUBLICATIONS

Journal of Applied Polymer Science, vol. 39, pp. 2119–2128, 1990.

*Primary Examiner*—Richard L. Schilling
*Attorney, Agent, or Firm*—Carl F. Ruoff

[57] ABSTRACT

The present invention describes an imaging element having a support, and at least one layer formed from an aqueous coating composition containing a film forming binder. The film forming binder is a mixture of a polyurethane and a carboxylic acid containing polymer or copolymer having a glass transition temperature of at least 40° C. and an acid number of 60 to 260. The carboxylic acid containing polymer or copolymer is reacted with ammonia or amine so that the coating composition has a pH of from 7 to 10.

10 Claims, No Drawings

COATING COMPOSITION INCLUDING POLYURETHANE FOR IMAGING ELEMENTS

This application relates to commonly assigned copending application Ser. No. 08/712,006, Express Mail No. TB440987360 which is filed simultaneously herewith and hereby incorporated by reference for all that it discloses. This application relates to commonly assigned copending Ser. No. 08/712,018, Express Mail No. TB440987349 which is filed simultaneously and hereby incorporated by reference for all that it discloses. This application relates to commonly assigned copending application Ser. No. 08/712,029, Express Mail No. TB44098559X which is filed simultaneously herewith and hereby incorporated by reference for all that it discloses. This application relates to commonly assigned copending application Ser. No. 08/712,016, Express Mail No. TB440987404 which is filed simultaneously herewith and hereby incorporated by reference for all that it discloses. This application relates to commonly assigned copending application Ser. No. 08/712,010, Express Mail No. TE44098735X which is filed simultaneously herewith and hereby incorporated by reference for all that it discloses.

FIELD OF THE INVENTION

This invention relates in general to imaging elements, and in particular to imaging elements comprising a support material containing at least one layer coated from an aqueous coating solution having therein a film forming binder comprising mixtures of a polyurethane and a carboxylic acid containing vinyl copolymer. The invention provides coating compositions that have improved manufacturing and film forming characteristics. The coated layer is free of drying defects, and exhibits superior physical properties including exceptional transparency and exceptional toughness necessary for providing resistance to scratches, abrasion, blocking, and ferrotyping. In addition, coatings of the present invention provide a reduction in the amount of volatile organic compounds emitted during the drying process, and are, therefore, more attractive from an environmental standpoint.

BACKGROUND OF THE INVENTION

Support materials for an imaging element often employ layers comprising glassy, hydrophobic polymers such as polyacrylates, polymethacrylates, polystyrenes, or cellulose esters, for example. One typical application for such a layer is as a backing layer to provide resistance to scratches, abrasion, blocking, and ferrotyping. The latter two properties relate to the propensity of layers applied onto the support material or imaging element to stick together as a result of the adverse humidity, temperature, and pressure conditions that may occur during the manufacture and use of the imaging element.

These glassy polymers are typically coated from organic solvent-based solutions to yield a continuous film upon evaporation of the solvent. However, because of environmental considerations it is desirable to replace organic solvent-based coating formulations with water-based coating formulations. The challenge has been to develop water-based coatings that provide similar physical and chemical properties in the dried film that can be obtained with organic-solvent based coatings.

Water insoluble polymer particles contained in aqueous latexes and dispersions reported to be useful for coatings on photographic films typically have low glass transition temperatures (Tg) to insure coalescence of the polymer particles into a strong, continuous film. Generally the Tg of such polymers is less than 50° C. Typically these polymers are used in priming or "subbing" layers which are applied onto the film support to act as adhesion promoting layers for photographic emulsion layers. Such low Tg polymers, although useful when they underlay an emulsion layer, are not suitable as, for example, backing layers since their blocking and ferrotyping resistance are poor. To fully coalesce a polymer latex which has a higher Tg requires significant concentrations of coalescing aids. This is undesirable for several reasons. Volatilization of the coalescing aid as the coating dries is not desirable from an environmental standpoint. In addition, subsequent recondensation of the coalescing aid in the cooler areas of the coating machine may cause coating imperfections and conveyance problems. Coalescing aid which remains permanently in the dried coating will plasticize the polymer and adversely affect its resistance to blocking, ferrotyping, and abrasion.

An approach reported to provide aqueous coatings that require little or no coalescing aid is to use core-shell latex polymer particles. A soft (low Tg) shell allows the polymer particle to coalesce and a hard (high Tg) core provides the desirable physical properties. The core-shell polymers are prepared in a two-stage emulsion polymerization process. The polymerization method is non-trivial and heterogeneous particles that contain the soft polymer infused into the hard polymer, rather than a true core-shell structure, may result (*Journal of Applied Polymer Science*, Vol. 39, page 2121, 1990). Aqueous coating compositions comprising core-shell latex polymer particles and use of such coalescing aid-free compositions as ferrotyping resistant layers in photographic elements are disclosed in Upson and Kestner U.S. Pat. No. 4,497,917 issued Feb. 5, 1985. The polymers are described as having a core with a Tg of greater than 70° C. and a shell with a Tg from 25 to 60° C.

U.S. Pat. Nos. 5,447,832 and 5,366,855 describe for imaging elements a coalesced layer comprising film-forming colloidal polymer particles and non-film forming colloidal polymer particles. Those layers are coated from aqueous medium and contain polymer particles of both high and low glass transition temperatures. Typically, the film forming colloidal polymer particles consist of low Tg polymers, and are present in the coated layers from 20 to 70 percent by weight.

U.S. Pat. No. 3,895,949 describes a photosensitive element having a layer of photosensitive material that is overcoated with a protective layer containing a copolymer obtained by reaction between about 10 to 70 percent by weight of an unsaturated carboxylic acid and at least one ethylenically unsaturated compound comprising up to 40 percent by weight of a hard component such as styrene or methyl methacrylate and about 50 to 30 percent by weight of a soft component such as ethyl acrylate, or butyl acrylate. Polymer particles that have such compositions are of low Tg, and therefore can coalesce and form a transparent film very easily under normal drying conditions used for manufacturing photographic elements. However, such low Tg polymers are not suitable as, for example, backing layers since their blocking and ferrotyping resistance are poor.

U.S. Pat. Nos. 5,166,254 and 5,129,916 describe a water-based coating composition containing mixtures of an acrylic latex, and an acrylic hydrosol. The acrylic latex contains 1 to 15% of methylol (meth)acrylamide, 0.5 to 10% carboxylic acid containing monomer, and 0.5 to 10% hydroxyl containing monomer, and has a Tg of from −40 to 40° C. and a molecular weight of from 500,000 to 3,000,000. U.S. Pat. Nos. 5,314,945 and 4,954,559 describe a water-based coating composition containing an acrylic latex and a polyurethane. The acrylic latex contains 1 to 10% of methylol (meth)acrylamide, 0.5 to 10% carboxylic acid containing monomer, and 0.5 to 10% hydroxyl containing monomer, and has a Tg of from −40 to 40° C. and a molecular weight of from 500,000 to 3,000,000. U.S. Pat. No. 5,204,404 describes a water-based coating composition containing mixture of a dispersed acrylic silane polymer and a polyurethane. The acrylic silane polymer prepared by emulsion polymerization contains 1 to 10% of silane containing acrylates, 0.1 to 10% of carboxylic acid containing monomer, and 2 to 10% of hydroxyl containing monomer. The polymer has a Tg of from −40 to 25° C. and a molecular weight of from 500,000 to 3,000,000.

Film formation from a coating composition in general involves the deposition of a coating liquid onto a substrate and its transformation into an adherent solid coating. During such a process, the solvent must be removed without adversely affecting the performance properties of the coating and without introducing defects into the coating. The drying step is therefore extremely important in defect formation because it is the last step in the process where the chemistry and physical properties of the product can be affected. For a perfect solid coating to form, the film must remain liquid long enough after deposition to allow the surface defects to flow out and disappear. However, if the wet coating remains as a low viscosity liquid for too long a time period, non-uniform airflow in the dryer can cause non-uniform flow of the wet coating at the surface, resulting in the formation of so-called drying mottle. Drying mottle is defined as an irregularly patterned defect that can be gross, and at times it can have an iridescent pattern. The iridescence pattern is very objectionable to a customer. For example, in the case of microfilms, customers normally view the image as film is lighted from the backside. If the backing layer exhibits an iridescence pattern, it can have a deleterious effect on the ability of a customer to view the image.

For coating compositions comprising solution polymers, the viscosity of the coating during drying is a strong function of polymer concentration. Their film formation ability is therefore very good, the dried film is uniform, and its surface is fairly smooth. For aqueous coating compositions comprising water insoluble polymer particles, the viscosity build-up during drying is a very slow function of solids. The wet coating surface is therefore very prone to air disturbance, and to surface tension forces. Consequently, films formed from aqueous coating compositions comprising water insoluble polymer particles often exhibit an objectionable iridescence pattern.

Film formation from aqueous coating compositions comprising water insoluble polymer particles also involves particle packing and deformation. Particles have to experience a significant amount of deformation to form a continuous, transparent film. The pressure profile due to particle elastic deformation is such that the particle is in compression at the center of the particle and in tension at the edges. As long as there is no polymer flow or polymer chain diffusion across the particle—particle interface, as is the case in photographic support coating applications due to very limited dryer length and very short drying time, the particle—particle interface is very weak, and internal stress will tend to separate the particles along that interface. Unless the dried coating experiences further heat relaxation at high temperature, the internal stress will persist and result in adhesion failure at the particle—particle interface or the particle-substrate interface.

In recent years, the conditions under which the imaging elements are manufactured and utilized have become even more severe. This is either because applications for imaging elements have been extended to more severe environments or conditions, for example, higher temperatures must be withstood during manufacturing, storage, and use, or because manufacturing and processing speeds have been increased for greater productivity. Under these conditions, the above mentioned methods to obtain aqueous coating compositions free of organic solvents become deficient with regard to simultaneously satisfying all of the physical, chemical, and manufacturing requirements for an aqueous coating for imaging applications. For example, the image elements are more severely scratched during high speed finishing processes. A foremost objective of the present invention is therefore to provide an aqueous coating composition which is essentially free of organic solvent, has excellent film forming characteristics under drying conditions used for imaging support manufacturing processes, and forms a dried layer free of drying mottle and with excellent resistance to physical scratch and abrasion, and to sticking and ferrotyping even at high temperatures.

SUMMARY OF THE INVENTION

In accordance with the present invention, an image element comprises a support having thereon at least one layer coated from an aqueous coating solution having therein a film forming binder, wherein the binder comprises mixtures of a polyurethane and a carboxylic acid containing vinyl polymer or copolymer having a glass transition temperature of at least 40° C. and an acid number of from 60 to 260. The carboxylic acid groups of the polymer or copolymer are reacted with ammonia or amine to provide a pH of the composition of about 7 to 10.

DESCRIPTION OF THE INVENTION

The imaging elements to which this invention relates can be any of many different types depending on the particular use for which they are intended. Such elements include, for example, photographic, electrostatographic, photothermographic, migration, electrothermographic, dielectric recording, and thermal dye transfer imaging elements.

The support material used with this invention can comprise various polymeric films, papers, glass, and the like, but both acetate and polyester supports well known in the art are preferred. The thickness of the support is not critical. Support thicknesses of 2 to 10 mil (0.002 to 0.010 inches) can be used. The polyester support typically employs an undercoat or subbing layer well known in the art that comprises, for example, for polyester support a vinylidene chloride/methyl acrylate/itaconic acid terpolymer or vinylidene chloride/acrylonitrile/acrylic acid terpolymer. The layers of this invention can be employed as subbing layers, interlayers, overcoat layers, backing layers, receiving layers, barrier layers; timing layers, antihalation layers, antistatic layers, stripping layers, transparent magnetic layers, protective overcoats for antistatic layers, and the like. The layers in accordance with this invention are particularly advantageous due to superior physical properties including exceptional transparency and toughness necessary for providing resistance to scratches, abrasion, blocking, and ferrotyping.

Coating compositions for forming the layers in accordance with the present invention comprise a continuous aqueous phase having therein a film forming binder, wherein the binder comprise mixtures of a polyurethane and a carboxylic acid containing vinyl copolymer having a glass transition temperature of at least 40° C. and an acid number of from 60 to 260. Acid number is in general determined by titration and is defined as the number of milligrams of KOH required to neutralize 1 gram of the polymer. The carboxylic acid groups of the polymer or copolymer are reacted with ammonia or amine to provide a pH of the composition of about 7 to 10. The glass transition temperature of the polymer is measured before neutralization of its carboxylic acid group with ammonia or amine. Preferably, the vinyl polymer has a glass transition temperature of greater than 60° C. If the acid number of the polymer is larger than 260, the resultant aqueous coating has a high viscosity, and gives a dried layer having poor water resistance. Other additional compounds may be added to the coating composition, depending on the functions of the particular layer, including surfactants, emulsifiers, coating aids, matte particles, rheology modifiers, crosslinking agents, inorganic fillers such as conductive and nonconductive metal oxide particles, pigments, magnetic particles, biocide, and the like. The coating composition may also include a small amount of organic solvent, preferably the concentration of organic solvent is less than 1 percent by weight of the total coating composition.

The film forming binder of the composition in accordance with the present invention contains about 10–90% by weight of a carboxylic acid containing vinyl copolymer, and about 10–90% by weight of a polyurethane. Preferably, the binder contains about 30 to 80% by weight of the carboxylic acid containing vinyl copolymer, and about 20 to 70% by weight of the polyurethane.

The carboxylic acid containing vinyl polymers useful for the present invention include those obtained by interpolymerizing one or more ethylenically unsaturated monomers containing carboxylic acid groups with other ethylenically unsaturated monomers including, for example, alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids such as 2-hydroxyethyl acrylate, 2-hydroxyethyl methacrylate, and 2-hydroxypropyl methacrylate, the nitrile and amides of the same acids such as acrylonitrile, methacrylonitrile, and methacrylamide, vinyl acetate, vinyl propionate, vinylidene chloride, vinyl chloride, and vinyl aromatic compounds such as styrene, t-butyl styrene and vinyl toluene, dialkyl maleates, dialkyl itaconates, dialkyl methylene-malonates, isoprene, and butadiene. Suitable ethylenically unsaturated monomers containing carboxylic acid groups include acrylic monomers such as acrylic acid, methacrylic acid, ethacrylic acid, itaconic acid, maleic acid, fumaric acid, monoalkyl itaconate including monomethyl itaconate, monoethyl itaconate, and monobutyl itaconate, monoalkyl maleate including monomethyl maleate, monoethyl maleate, and monobutyl maleate, citraconic acid, and styrenecarboxylic acid.

When the polymerization is carried out using a hydroxyl-containing monomer such as a C2–C8 hydroxyalkyl esters of acrylic or methacrylic acid, a vinyl polymer containing a hydroxyl group as well as a carboxyl group can be obtained.

The vinyl polymers according to the present invention may be prepared by conventional solution polymerization methods, bulk polymerization methods, emulsion polymerization methods, suspension polymerization methods, or dispersion polymerization methods. The polymerization process is initiated in general with free radical initiators. Free radicals of any sort may be used. Preferred initiators include persulfates (such as ammonium persulfate, potassium persulfate, etc., peroxides (such as hydrogen peroxide, benzoyl peroxide, cumene hydroperoxide, tertiary butyl peroxide, etc.), azo compounds (such as azobiscyanovaleric acid, azoisobutyronitrile, etc.), and redox initiators (such as hydrogen peroxide-iron(II) salt, potassium persulfate-sodium hydrogen sulfate, etc.). Common chain transfer agents or mixtures thereof known in the art, such as alkyl-mercaptans, can be used to control the polymer molecular weight.

When the solution polymerization is employed, examples of suitable solvent medium include ketones such as methyl ethyl ketone, methyl butyl ketone, esters such as ethyl acetate, butyl acetate, ethers such as ethylene glycol monobutyl ether, and alcohols such as 2-propanol, 1-butanol. The resultant vinyl polymer can be redispersed in water by neutralizing with an amine or ammonia. The organic solvent is then removed by heating or distillation. In this regard, organic solvents which are compatible with water are preferred to be used as reaction medium during solution polymerization. Suitable examples of amines which can be used in the practice of the present invention include diethyl amine, triethyl amine, isopropyl amine, ethanolamine, diethanolamine, and morpholine.

A preferred method of preparing the vinyl polymer of the present invention is by an emulsion polymerization process where an ethylenically unsaturated monomers or mixtures are mixed together with a water soluble initiator and a surfactant. The emulsion polymerization process is well known in the art (see, for example, Padget, J. C. in Journal of Coating Technology, Vol 66, No. 839, pages 89–105, 1994; El-Aasser, M. S. and Fitch, R. M. Ed. Future Directions in Polymer Colloids, NATO ASI Series, No 138, Martinus Nijhoff Publishers, 1987; Arshady, R. Colloid & Polymer Science, 1992, No 270, pages 717–732; Odian, G. Principles of Polymerization, 2nd Ed. Wiley(1981); and Sorenson, W. P. and Campbell, T. W. Preparation Method of Polymer Chemistry, 2nd Ed, Wiley (1968)). The polymerization process is initiated with free radical initiators. Free radicals of any sort can be used. Preferred initiators include those already described. Surfactants which can be used include, for example, a sulfate, a sulfonate, a cationic compound, an amphoteric compound, and a polymeric protective colloid. Specific examples are described in "McCUTCHEON'S Volume 1: Emulsifiers & Detergents, 1995, North American Edition".

The vinyl polymer particles made by emulsion polymerization are further treated with ammonia or amine to neutralize carboxylic acid groups and adjust the dispersion to pH values from 7 to 10.

Crosslinking comonomers can be used in the emulsion polymerization to lightly crosslink the polymer particles. It is preferred to keep the level of the crosslinking monomers low so as not to affect the polymer film forming characteristics. Preferred crosslinking comonomers are monomers which are polyfunctional with respect to the polymerization reaction, including esters of unsaturated monohydric alcohols with unsaturated monocarboxylic acids, such as allyl methacrylate, allyl acrylate, butenyl acrylate, undecenyl acrylate, undecenyl methacrylate, vinyl acrylate, and vinyl methacrylate, dienes such as butadiene and isoprene, esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, and polyfunctional aromatic compounds such as divinyl benzene.

The preparation of aqueous polyurethane dispersions is well known in the art. All the preparation methods share two common features. In all cases, the first step is the formation of a medium molecular weight isocyanate terminated prepolymer by the reaction of suitable di or polyol with a stocchiometric excess of di or polyisocyanate. The polymer to be dispersed in water is functionalized with water-solubilizing/dispersing groups which are introduced either into the prepolymer prior to chain extension, or are introduced as part of the chain extension agent. Therefore, small particle size stable dispersions can frequently be produced without the use of an externally added surfactant.

In the solution process, the isocyanate terminated polyurethane prepolymer is chain extended in solution in order to prevent an excessive viscosity being attained. The preferred solvent is acetone, and hence this process is frequently referred to as the acetone process. The chain extender can, for example, be a sulphonate functional diamine, in which case the water-solubilizing/dispersing group is introduced at the chain extension step. The chain extended polymer is thus more properly described as a polyurethane urea. Water is then added to the polymer solution without the need for high shear agitation, and after phase inversion a dispersion of polymer solution in water is obtained.

In the prepolymer mixing process, a hydrophilically modified isocyanate terminated prepolymer is chain extended with diamine or polyamine at the aqueous dispersion step. This chain extension is possible because of the preferential reactivity of isocyanate groups with amine rather than with water. In order to maintain this preferential reactivity with amine, it is necessary to prevent the water temperature from exceeding the value at which significant reactions occur between water and the isocyanate. The choice of isocyanates is clearly important in this respect. The prepolymer mixing process is extremely flexible in terms of the range of aqueous polyurethane ureas which can be prepared, and has the major advantages that it avoids the use of large amounts of solvent and the need for the final polymer to be solvent soluble.

The ketamine/ketazine process can be regarded as a variant of the prepolymer mixing process. The chain extending agent is a ketone-blocked diamine (ketamine) or ketone-blocked hydrazine (ketazine) which is mixed directly with the isocyanate terminated polyurethane prepolymer. During the subsequent water dispersion step, the ketamine or ketazine is hydrolyzed to generate free diamine or hydrazine respectively, and thus quantitative chain extension takes place. An advantage of the ketamine process over the prepolymer mixing process is that it is better suited for preparing aqueous urethanes based on the more water reactive aromatic isocyanates.

The hot melt process involves the capping of a functionalized isocyanate terminated polyurethane prepolymer with urea at >130° C. to form a biuret. This capped polyurethane (which can be solvent free) is dispersed in water at about 100° C. to minimize viscosity, and chain extension carried out in the presence of the water by the reaction with formaldehyde which generates methylol groups, which in turn self-condense to give the desired molecular weight buildup.

Anionic, cationic, or nonionically stabilized aqueous polyurethane dispersions can be prepared. Anionic dispersions contain usually either carboxylate or sulphonate functionalized co-monomers, e.g., suitably hindered dihydroxy carboxylic acids (dimethylol propionic acid) or dihydroxy sulphonic acids. Cationic systems are prepared by the incorporation of diols containing tertiary nitrogen atoms, which are converted to the quaternary ammonium ion by the addition of a suitable alkylating agent or acid. Nonionically stabilized aqueous polyurethanes can be prepared by the use of diol or diisocyanate co-monomers bearing pendant polyethylene oxide chains. Such polyurethane dispersions are colloidally stable over a broad pH range. Combinations of nonionic and anionic stabilizations are sometimes utilized to achieve a combination of small particle size and strong stability.

Polyols useful for the preparation of polyurethane dispersion of the present invention include polyester polyol prepared from a diol (e.g. ethylene glycol, butylene glycol, neopentyl glycol, hexane diol or mixtures of any of the above) and a dicarboxylic acid or an anhydride (succinic acid, adipic acid, suberic acid, azelaic acid, sebacic acid, phthalic acid, isophthalic acid, maleic acid and anhydrides of these acids), polylactones from lactones such as caprolactone reacted with a diol, polyethers such as polypropylene glycols, and hydroxyl terminated polyacrylics prepared by addition polymerization of acrylic esters such as the aforementioned alkyl acrylate or methacrylates with ethylenically unsaturated monomers containing functional groups such as carboxyl, hydroxyl, cyano groups and/or glycidyl groups.

Diisocyanates that can be used are as follows: toluene diisocyanate, tetramethylene diisocyanate, hexamethylene diisocyanate, isophorone diisocyanate, ethylethylene diisocyanate, 2,3-dimethylethylene diisocyanate, 1-methyltrimethylene diisocyanate, 1,3-cycopentylene diisocyanate, 1,4-cyclohexylene diisocyanate, 1,3-phenylene diisocyanate, 4,4'-biphenylene diisocyanate, 1,5-naphthalene diisocyanate, bis-(4-isocyanatocyclohexyl)-methane, 4,4'diisocyanatodiphenyl ether, tetramethyl xylene diisocyanate and the like.

Compounds that are reactive with the isocyanate groups and have a group capable of forming an anion are as follows: dihydroxypropionic acid, dimethylolpropionic acid, dihydroxysuccinic acid and dihydroxybenzoic acid. Other suitable compounds are the polyhydroxy acids which can be prepared by oxidizing monosaccharides, for example gluconic acid, saccharic acid, mucic acid, glucuronic acid and the like.

Suitable tertiary amines which are used to neutralize the acid and form an anionic group for water dispersability are trimethylamine, triethylamine, dimethylaniline, diethylaniline, triphenylamine and the like.

Diamines suitable for chain extension of the polyurethane include ethylenediamine, diaminopropane, hexamethylene diamine, hydrazine, amnioethylethanolamine and the like.

The coating composition in accordance with the invention may also contain suitable crosslinking agents which can react with carboxylic acid groups or hydroxyl groups including epoxy compounds, polyfunctional aziridines, methoxyalkyl melamines, triazines, polyisocyanates, carbodiimides, and the like.

Matte particles well known in the art may also be used in the coating composition of the invention, such matting agents have been described in *Research Disclosure* No. 308119, published Dec. 1989, pages 1008 to 1009. When polymer matte particles are employed, the polymer may contain reactive functional groups capable of forming covalent bonds with the binder polymer by intermolecular crosslinking or by reaction with a crosslinking agent in order to promote improved adhesion of the matte particles to the coated layers. Suitable reactive functional groups include: hydroxyl, carboxyl, carbodiimide, epoxide, aziridine, vinyl sulfone, sulfinic acid, active methylene, amino, amide, allyl, and the like.

The coating composition of the present invention may also include lubricants or combinations of lubricants to reduce the sliding friction of the photographic elements in accordance with the invention. Typical lubricants include (1) silicone based materials disclosed, for example, in U.S. Pat. Nos. 3,489,567, 3,080,317, 3,042,522, 4,004,927, and 4,047,958, and in British Patent Nos. 955,061 and 1,143,118; (2) higher fatty acids and derivatives, higher alcohols and derivatives, metal salts of higher fatty acids, higher fatty acid esters, higher fatty acid amides, polyhydric alcohol esters of higher fatty acids, etc., disclosed in U.S. Pat. Nos. 2,454,043; 2,732,305; 2,976,148; 3,206,311; 3,933,516; 2,588,765; 3,121,060; 3,502,473; 3,042,222; and 4,427,964, in British Patent Nos. 1,263,722; 1,198,387; 1,430,997; 1,466,304; 1,320,757; 1,320,565; and 1,320,756; and in German Patent Nos. 1,284,295 and 1,284,294; (3) liquid paraffin and paraffin or wax like materials such as carnauba wax, natural and synthetic waxes, petroleum waxes, mineral waxes and the like; (4) perfluoro- or fluoro- or fluorochloro-containing materials, which include poly(tetrafluoroethlyene), poly(trifluorochloroethylene), poly(vinylidene fluoride, poly(trifluorochloroethylene-co-vinyl chloride), poly(meth)acrylates or poly(meth)acrylamides containing perfluoroalkyl side groups, and the like. Lubricants useful in the present invention are described in further detail in Research Disclosure No.308119, published Dec. 1989, page 1006.

The coating composition of the invention can be applied by any of a number of well known techniques, such as dip coating, rod coating, blade coating, air knife coating, gravure coating and reverse roll coating, extrusion coating, slide coating, curtain coating, and the like. After coating, the layer is generally dried by simple evaporation, which may be accelerated by known techniques such as convection heating. Known coating and drying methods are described in further detail in Research Disclosure No. 308119, Published Dec. 1989, pages 1007 to 1008.

In a particularly preferred embodiment, the imaging elements of this invention are photographic elements, such as photographic films, photographic papers or photographic glass plates, in which the image-forming layer is a radiation-sensitive silver halide emulsion layer. Such emulsion layers typically comprise a film-forming hydrophilic colloid. The most commonly used of these is gelatin and gelatin is a particularly preferred material for use in this invention. Useful gelatins include alkali-treated gelatin (cattle bone or hide gelatin), acid-treated gelatin (pigskin gelatin) and gelatin derivatives such as acetylated gelatin, phthalated gelatin and the like. Other hydrophilic colloids that can be utilized alone or in combination with gelatin include dextran, gum arabic, zein, casein, pectin, collagen derivatives, collodion, agar-agar, arrowroot, albumin, and the like. Still other useful hydrophilic colloids are water-soluble polyvinyl compounds such as polyvinyl alcohol, polyacrylamide, poly(vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material.

In addition to emulsion layers, the photographic elements of the present invention can contain one or more auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. The support can be any suitable support used with photographic elements. Typical supports include polymeric films, paper (including polymer-coated paper), glass and the like. Details regarding supports and other layers of the photographic elements of this invention are contained in Research Disclosure, Item 36544, September, 1994.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in Research Disclosure, Item 36544, September, 1994, and the references listed therein.

The photographic silver halide emulsions utilized in this invention can contain other addenda conventional in the photographic art. Useful addenda are described, for example, in Research Disclosure, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The present invention will now be described in detail with reference to examples; however, the present invention should not be limited to these examples.

The examples demonstrate the benefits of the aqueous coating compositions of the present invention, and in particular show that the coating compositions of the present invention have excellent film-forming characteristics under drying conditions typically used in the photographic support manufacturing process. The coated layer is free of drying defects, and exhibits superior physical properties including exceptional transparency and exceptional toughness necessary for providing resistance to scratches, abrasion, blocking, and ferrotyping.

EXAMPLES

Preparation of Aqueous Coating Compositions Used in the Example Coatings

The aqueous coating compositions used in the example coatings are prepared by first forming a carboxylic acid containing copolymer latex, adjusting the latex pH with a 20 weight percent triethyl amine solution, and mixing the latex with a polyurethane dispersion and other components used in the coating composition. The polyurethane used in the example coatings is Neorez R960 polyurethane dispersion from Zeneca Resins Inc.

The following shows an example of preparing a poly (methyl methacrylate-co-methacrylic acid) latex. It is understood other carboxylic acid containing vinyl polymers can be prepared in a similar manner.

A stirred reactor containing 1012 g of deionized water and 3 g of Triton 770 surfactant (Rohm & Haas Co.) is heated to 80° C and purged with $N_2$ for 1 hour. After addition of 1 g of potassium persulfate, an emulsion containing 2.7 g of Triton 770 surfactant, 267 g of deionized water, 255 g of methyl methacrylate, 45 g of methacrylic acid, 6 g of methyl-3-mercaptopropionate chain transfer agent, and 0.5 g of potassium persulfate is slowly added over a period of 1 hour. The reaction is allowed to continue for 4 more hours before the reactor is cooled down to room temperature. The latex prepared is filtered through an ultrafine filter (5 $\mu$m cut-off) to remove any coagulum. The polymer particle so prepared has an acid number of 97.8, and a weight average molecular weight of 24,000. The latex has a pH value of 2.0–2.5.

Table 1 shows the carboxylic acid containing vinyl copolymers used in the coating examples. In Table 1, $M_w$ represents the copolymer molecular weight, Tg represents the glass transition temperature of the copolymer, MMA represents methyl methacrylate, MAA represents methacrylic acid, AA represents acrylic acid, BA represents butyl acrylate, and EMA represents ethyl methacrylate. Table 1 also lists the acid number of the copolymer.

TABLE 1

| Polymer | Composition | $M_w$ | Tg, °C. | Acid # |
|---|---|---|---|---|
| P-1 | EMA/MAA 85/15 wt % | $3.2 \times 10^5$ | 70 | 97.8 |
| P-2 | EMA/MAA 85/15 wt % | $5.0 \times 10^4$ | 70 | 97.8 |
| P-3 | MMA/MAA 85/15 wt % | $2.5 \times 10^5$ | 130 | 97.8 |
| P-4 | MMA/MAA 85/15 wt % | $2.4 \times 10^5$ | 130 | 97.8 |
| P-5 | MMA/MAA 80/20 wt % | $2.9 \times 10^5$ | 130 | 130.4 |
| P-6 | MMA/MAA 80/20 wt % | $2.4 \times 10^4$ | 130 | 130.4 |
| P-7 | MMA/MAA 90/10 wt % | $1.4 \times 10^4$ | 125 | 65.2 |
| P-8 | MMA/BA/MAA 65/25/10 wt % | $4.3 \times 10^5$ | 73 | 65.2 |
| P-9 | MMA/MAA 97/3 wt % | | 130 | 19.5 |

Comparative Samples A–B and Examples 1–8

Aqueous coating solutions comprising 7 weight percent total solids are coated with a doctor blade onto a polyethylene terephthalate) support that has been subbed with a terpolymer latex of acrylonitrile, vinylidene chloride, and acrylic acid. The coating is dried at 100° C. for 2 minutes to give a dry coating weight of 1076 mg/$M^2$, and the coating appearance is recorded. The results are listed in Table 2. Table 2 also shows the pH of the aqueous coating compositions. The abrasion resistance for the dried coating is measured in accordance with the procedure set forth in ASTM D1044. Elvacite 2041 is methyl methacrylate polymer sold by ICI Acrylic Inc. and is coated from organic solvent to give a dry coating weight of 1076 mg/$m^2$. All coatings shown in Table 2 are transparent. In Table 2, 0=very low level of iridescence observed in the dried layer, 1=medium level of iridescence observed in the dried layer, and 2=high level of iridescence observed in the dried layer.

TABLE 2

| Coating | Composition | pH | Iridescence Level | Taber Abr. (% haze) |
|---|---|---|---|---|
| Sample A | Solvent coated Elvacite 2041 | — | 0 | 12.0 |
| Sample B | P-9/Neorez R960 * 65/35 wt % | 5–6 | 1–2 | 11.0 |
| Example 1 | P-1/Neorez R960 * 70/30 wt % | 9.5 | 0 | 11.9 |
| Example 2 | P-2/Neorez R960 * 70/30 wt % | 9.2 | 0 | 13.8 |
| Example 3 | P-3/Neorez R960 * 70/30 wt % | 9.0 | 0 | 12.7 |
| Example 4 | P-4/Neorez R960 * 70/30 wt % | 9.2 | 0 | 10.7 |
| Example 5 | P-5/Neorez R960 * 70/30 wt % | 9.0 | 0 | 11.0 |
| Example 6 | P-6/Neorez R960 * 70/30 wt % | 10.0 | 0 | 10.7 |
| Example 7 | P-7/Neorez R960 * 70/30 wt % | 9.0 | 0 | 12.7 |
| Example 8 | P-8/Neorez R960 * 70/30 wt % | 10.0 | 0 | 17.0 |

* These coatings contain a CX-100 crosslinker, which is a polyfunctional aziridine sold by Zeneca Resins Inc.

Comparable sample A comprises a methyl methacrylate polymer coated from organic solvent, and the coating is therefore has very low level of iridescence and good scratch resistance. Comparative samples B is prepared from an aqueous coating composition comprising a mixture of Neorez R960 polyurethane and MMA/MAA vinyl copolymer particles having a low acid number. The dried coating has an unacceptable high level of iridescence. On the other hand, the coating prepared from aqueous coating compositions in accordance with the present invention have very low level of iridescence and excellent resistance to mechanical scratch and abrasion.

Comparative Samples C and Examples 9–15

The following examples show that the coating compositions of the invention provide void-free, impermeable films that are comparable with organic solvent applied layers. A subbed polyester film support as previously described was coated with an aqueous antistatic formulation comprising 0.025 weight percent of silver-doped vanadium pentoxide, 0.075 weight percent of a terpolymer latex of methylacrylate, vinylidene chloride, and itaconic acid (15/83/2) and dried at 100° C. to yield an antistatic layer having a dry weight of about 8 mg/m². Aqueous coating compositions of the invention containing 7 weight percent solids were applied over the antistatic layer and dried for 2 minutes at 100° C. to yield transparent coatings having a dry weight of 250 to 750 mg/m². It is known (described in U.S. Pat. Nos. 5,006,451 and 5,221,598) that the antistatic properties of the vanadium pentoxide layer are destroyed after film processing if not protected by an impermeable barrier. Thus the permeability of the example coatings could be evaluated by measuring the antistatic properties of the samples after processing in conventional film developing and fixing solutions.

The samples are soaked in high pH (11.3) developing and fixing solutions as described in U.S. Pat. No. 4,269,929, at 38° C. for 60 seconds each and then rinsed in distilled water. The internal resistivity (using the salt bridge method) of the processed samples at 20% relative humidity is measured and compared with the internal resistivity before processing. The coating compositions and results are reported in Table 3. The results show that coating compositions of the invention give void-free coatings that are as impermeable as a solvent cast film (sample C).

TABLE 3

| Coating | Composition() | Resitivity Before Processing logΩ/□ | Resistivity After Processing logΩ/□ |
|---|---|---|---|
| Sample C | Solvent coated Elvacite 2041 | 7.2 | 7.3 |
| Example 9 | P-1/Neorez R960 * 70/30 wt % | 7.2 | 7.5 |
| Example 10 | P-2/Neorez R960 * 70/30 wt % | 7.2 | 7.1 |
| Example 11 | P-3/Neorez R960 * 70/30 wt % | 7.2 | 7.3 |
| Example 12 | P-4/Neorez R960 * 70/30 wt % | 7.2 | 7.2 |
| Example 13 | P-5/Neorez R960 * 70/30 wt % | 7.2 | 7.4 |
| Example 14 | P-6/Neorez R960 * 70/30 wt % | 7.2 | 7.2 |
| Example 15 | P-7/Neorez R960 * 70/30 wt % | 7.2 | 7.4 |

* These coatings contain a CX-100 crosslinker, which is a polyfunctional aziridine sold by Zeneca Resins Inc.

While there as been shown and described what are at present considered the preferred embodiments of the invention, it will be obvious to those skilled in the art that various alterations and modifications may be made without departing from the scope of the invention as defined by the appended claims. All such modifications are intended to be included in the present application.

We claim:

1. An imaging element comprising a support having thereon at least one layer formed from an aqueous coating composition containing a film forming binder wherein the film forming binder comprises a mixture of a polyurethane and a carboxylic acid containing vinyl polymer having a glass transition temperature of at least 40° C. and an acid number of from 60 to 260 wherein the carboxylic acid containing vinyl polymer is reacted with ammonia or amine so that the aqueous coating composition has a pH of from 7 to 10.

2. The imaging element according to claim 1 wherein:

the film forming binder contains from 10 to 90 weight percent of the carboxylic acid containing polymer and from 90 to 10 percent of the polyurethane.

3. The imaging element according to claim 1 wherein the carboxylic acid containing vinyl polymer is obtained by interpolymerizing one or more ethylenically unsaturated monomers containing carboxylic acid group with other ethylenically unsaturated monomers.

4. The imaging element of claim 3 wherein the ethylenically unsaturated monomers containing carboxylic acid groups are selected from the group consisting of acrylic monomers, monoalkyl itaconates, monoalkyl maleates, citraconic acid and styrene carboxylic acid.

5. The imaging element according to claim 3 wherein the other ethylenically unsaturated monomers are selected from the group consisting of alkyl esters of acrylic acid, alkyl esters of methacrylic acid, hydroxyalkyl esters of acrylic acid, hydroxyalkyl esters of methacrylic acid, nitrites of acrylic acid, nitriles of methacrylic acid, amides of acrylic acid, amides of methacrylic acid, vinyl acetate, vinyl propionate, vinylidene chloride, vinyl chloride, vinyl aromatic compounds, dialkyl maleates, dialkyl itaconates, dialkyl methylene-malonates, isoprene and butadiene.

6. The imaging element of claim 1 wherein the coating composition further comprises a crosslinking agent.

7. The imaging element of claim 1 wherein the coating composition further comprises matte particles.

8. The imaging element of claim 1 wherein the coating composition further comprises lubricants.

9. The imaging element of claim 1 wherein the coating composition further comprises conductive materials.

10. The imaging element of claim 1 wherein the coating composition further comprises magnetic recording materials.

* * * * *